April 21, 1959  A. P. OWENS  2,883,515
UNIVERSAL WELDING HEAD
Filed Aug. 22, 1956
FIG.1.
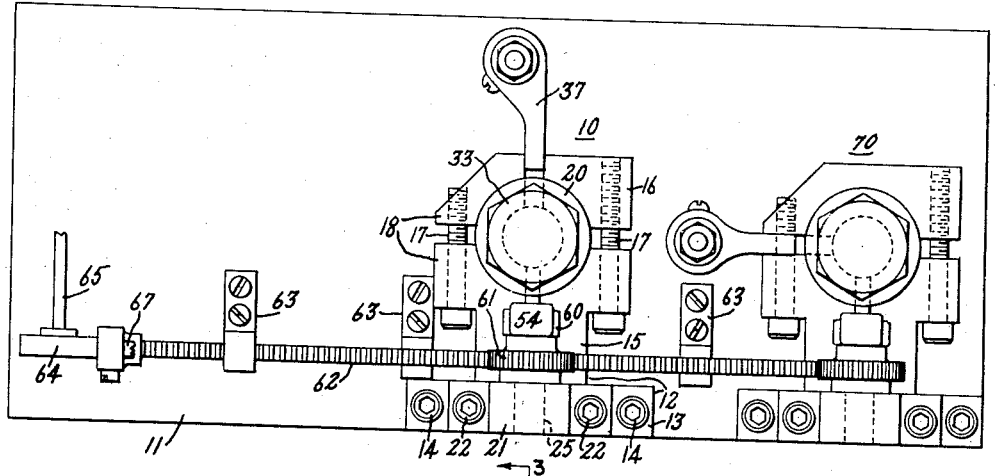
FIG.2.
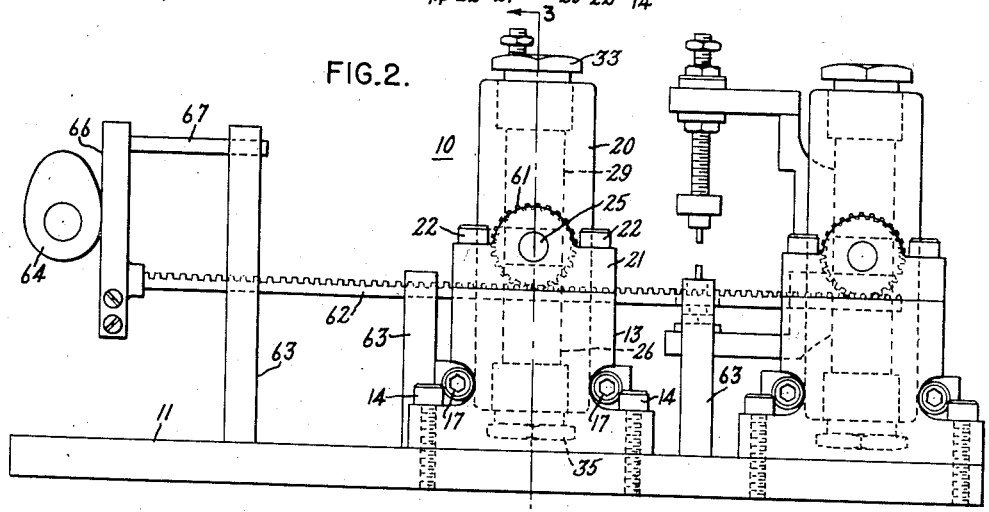
FIG.3.
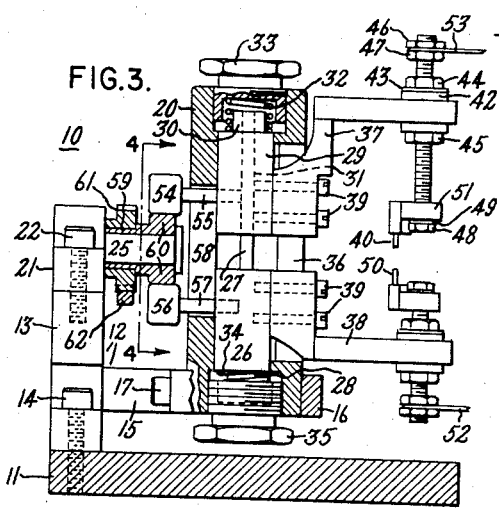
FIG.4.
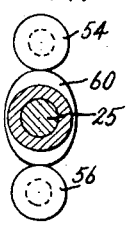
FIG.5.
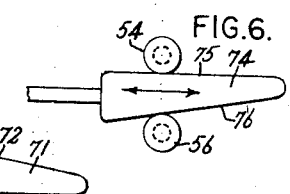
FIG.6.
FIG.7.
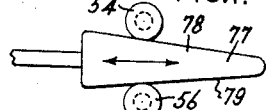
INVENTOR:
AUSTIN P. OWENS,
BY *Julius J. Fasholecky*
HIS ATTORNEY.

United States Patent Office 2,883,515
Patented Apr. 21, 1959

2,883,515
UNIVERSAL WELDING HEAD

Austin P. Owens, Clay, N.Y., assignor to General Electric Company, a corporation of New York Application August 22, 1956, Serial No. 605,500

3 Claims. (Cl. 219—86)

This invention relates to welding apparatus and more particularly to a spot welding device which is universally adjustable.

It has been customary in many prior art welding apparatus to maintain one electrode in a fixed position. These conventional types do not lend themselves readily to mass production methods particularly where the device on which a welding operation is to be performed is positioned in a fixture in such a way that both electrodes must move in order to reach and secure the work to make a proper weld. Also, conventional spot welding devices have been excessively massive, complex and expensive.

Accordingly, it is an object of this invention to provide a new and improved welding head which is universally adjustable.

A further object of this invention is to provide a new and improved welding head having electrodes which close at substantially the same rate producing a firm, even grip on the work.

Still another object of this invention is to provide a new and improved welding head which is economical and which occupies only a fraction of the space required by conventional types.

A further object of this invention is to provide a new and improved welding head which is particularly adaptable to mass production methods which require a plurality of welding operations in short time intervals.

Another object of this invention is to provide a new and improved welding head which is capable of performing welding operations of a delicate nature as, for example, in the fabrication of transistor devices or other miniature electronic components.

In carrying out this invention in one form thereof, a frame is provided for adjustably mounting a welding head body therein. The welding head body houses a pair of adjustable, spring-loaded plungers carrying a pair of electrode arms which are adapted to move relative to each other. An adjustable electrode is mounted on each of the electrode arms. The spring-loaded plungers are actuated by a cam driven mechanism to impart movement to said plungers to move said electrodes together in contact with a work surface. The amount of pressure on the plungers is adjustable so that the amount of pressure on a given work surface may be varied in accordance with the type, size and nature of the welding operation to be performed.

These and other advantages of this invention will be more clearly understood from the following description taken in connection with the accompanying drawings, and its scope will be apparent from the appended claims.

In the drawings,

Figure 1 is a top view of a pair of welding heads in accordance with this invention shown driven by a common mechanism, Figure 2 is a side elevational view of the welding heads and driving mechanism shown in Figure 1, Figure 3 is a cross-sectional view of the welding head embodied in this invention taken along lines 3—3 of Figure 2, Figure 4 is a cross-sectional view of the cam actuator mechanism taken along lines 4—4 of Figure 3, and Figures 5, 6 and 7 show alternative embodiments of cam actuator mechanisms which may be utilized in this invention.

Referring now to Figures 1, 2 and 3, and particularly to Figure 3 which shows more of the details of the welding head embodied in this invention, welding head 10 has a frame 12 having a vertical leg member 13 which is secured to base 11 by screws 14 and a horizontal leg member 15. Jaw 16 and horizontal leg member 15 connected by screws 17 provide a split clamp 18 which grips the body 20 of welding head 10. A split frame member 21 which houses shaft 25 is secured to vertical leg member 13 by screws 22.

Body member 20 is hollow in order to accommodate a moveable plunger 26 having a protruding rod 27 and a stud 28. It also houses plunger 29 having a stud 30. Plunger 29 is provided with a channel 31 therein in which rod 27 is free to move, either up or down. Stud 30 fits in a spring 32 which bears against plunger 29 and adjusting nut 33. A spring 34 is also provided around stud 28 which bears against plunger 26 and adjusting nut 35. By adjusting the nuts 33 and 35, the pressure on plungers 29 and 26, respectively may be varied urging the plungers either closer together or further apart as the case may be.

Body member 20 is provided with an elongated opening 36 to accommodate electrode arms 37 and 38. Electrode arms 37 and 38 are secured to respective flat portions on plungers 29 and 26 by screws 39. The cylindrical plungers are flattened along these portions to allow for a solid connection between the plungers and their respective electrode arms. Electrode arms 37 and 38 hold electrodes 40 and 50, respectively.

Electrode 40 is mounted on electrode arm 37 by a bolt 48 which is secured to the arm by lock nuts 44 and 45. These nuts are separated by an insulated bushing 42 and a washer 43. Bushing 42 insulates other portions of the welding head from welding electrode 40. The electrode fitting 51 may be screwed on the bolt 48 and is separated therefrom by washer 49. Electrode fitting 51 and electrode 40 may be integral if desired and may consist of a wide variety of sizes and shapes. Jam nuts 46 and 47 are used to secure electrical lead 53 to bolt 48. The electrode structure is the same for electrode 50 and consequently will not be described. An electrical lead 52 is connected to electrode 50 for supplying current thereto.

Welding head 10 is actuated by a cam driven mechanism including cam 60, bearing roll 54, actuator arm 55, bearing roll 56 and actuator arm 57. An opening 58 is provided in body member 20 to accommodate actuator arms 55 and 57 which are connected to plungers 29 and 26, respectively. Cam 60 is supported by shaft 25 which is provided with a bushing 59 and rides in split frame member 21. Cam 60 is driven by pinion 61 which mates with rack 62.

As seen in Figures 1 and 2, in this particular embodiment rack 62 is supported on brace 63. A reciprocal motor (not shown) imparts a reciprocal motion via shaft 65 to cam 64. Cam 64 bears against bearing plate 66 which is mounted on rack 62. A bearing rod 67 is used to support the bearing plate 66 on brace 63.

In operation, as rack 62 is moved by cam 64, pinion 61 turns shaft 25 which in turn rotates cam 60. Bearing rolls 54 follow the periphery of cam 60 and move closer together as cam 60 is rotated, consequently urging plungers 29 and 26 together. Since electrode arms 37 and 38 are connected to plungers 29 and 26 respectively they too will move together. Due to the fact that the plungers are spring-loaded, electrodes 40 and 50 will be urged together with a pressure corresponding to the amount of pressure applied to the plungers by their respective springs and adjusting nuts. Thus a very simple, totally adjustable device is provided for moving a pair of electrodes on a work surface at any desired pressure to accomplish a welding operation.

In Figures 1 and 2 a pair of welding heads 10 and 70 are shown driven by a common rack. The structure of welding head 70 is the same as that of welding head 10. Thus it will appear that a plurality of welding heads of the type embodied in this invention may be driven simultaneously or in sequence by a single drive mechanism allowing welds to be made in any sequence with proper control circuitry. As will be noted in Figure 1, the welding head 70 is displaced 90° from the welding head 10. The opening for the electrode arms in the body member of welding head 70 is machined at 90° with respect to the cam control arms. This is necessary in this showing due to the inflexibility of the common drive mechanism. However, with a different type of drive mechanism, it would be possible to rotate the welding head through 360° because of the adjustability of split clamp 18.

It will appear obvious to those skilled in the art, that a variety of cam driven mechanisms may be utilized in order to impart whichever motion is desired to the plungers in order to move the electrodes of the welding head together in any desired manner. Figures 5, 6 and 7 show alternative embodiments employing different cam mechanisms for imparting various motions to the plungers, and consequently to the electrodes. In Figure 5, cam 71 is provided in which the lower electrode is stationary while the upper electrode moves into contact with the lower electrode. Cam 71 has a flat lower edge 73 and a tapered upper edge 72 such that when reciprocal motion is applied, the cam bearing roll 54 moves down the cam along edge 72 while bearing roll 56 moves along the cam edge 73 in the same position relative to bearing roll 54. The bearing rolls 54 and 56 are connected and control the moving of the plungers 29 and 26 respectively, which in turn control the movement of electrode arms 37 and 38 respectively. Thus, the lower electrode remains in a relatively fixed position while the upper electrode moves into contact therewith.

Figure 6 shows an alternative embodiment in which the reverse is true. Cam 74 is provided with a straight upper edge 75 and a tapered lower edge 76. As reciprocal motion is applied to the cam, bearing roll 54 moves in a straight line, consequently maintaining the upper electrode in a relatively fixed position. On the other hand, bearing roll 56 moves along edge 76 bringing the lower electrode into contact with upper electrode.

Figure 7 shows another alternative embodiment with a cam actuating mechanism 77 in which the electrodes again move together at a constant rate as in the embodiment of Figure 4. Cam 77 has tapered edges 78 and 79 having the same slope with respect to each other. The bearing rolls then move down the cam bringing the upper and lower electrodes in contact.

The invention has been described with respect to the application of reciprocal motion upon the cam actuating mechanism. However, the welding head embodied in Figure 3 may be driven by rotary motion as well. It should be understood that the actuating arms may also be manually actuated.

The real advantage of the present invention over prior art disclosure lies in its simplicity and complete adjustability. It will be noted that the electrodes 40 and 50 may be moved freely to adapt the device for welding operations on materials of any size and shape. These electrodes may be swung 360° around their respective electrode arms to allow welding in any position. With the feature of split clamp 18 welding electrodes arms which carry the welding electrodes may be swung to almost any desirable position. Then too the adjustable loading features allow the right amount of pressure to be applied to any given welding job.

The welding head of this invention is simple to fabricate and may be mounted easily to adapt it for use in almost any type of welding operation. It is compact and a plurality of welding heads may be mounted and driven to perform a variety of welding operation and make it particularly suitable to be used in mass production assemblage. Since the electrodes move to the work it is particularly suitable for performing welding operations on small delicate parts such as electric components and transistor devices.

Since other modifications varied to fit particular operating requirements and environments will be apparent to those skilled in the art, the invention is not considered limited to the examples chosen for purposes of disclosure and covers all changes and modifications which do not constitute departures from the true spirit and scope of this invention.

What I claim as new and desire to secure by Letters Patent of the United States is:

1. In an electric welding head, in combination, a frame, a body member mounted in said frame, a pair of spring-loaded plungers mounted in said body member, one of said plungers having a channel therein and the other of said plungers having a protruding rod thereon adapted for slideable movement in said channel, means for adjustably varying the loading on each of said plungers, a pair of electrode arms each carrying an adjustable electrode secured to a respective one of said plungers, and cam driven means secured to said plungers for bringing said electrodes into and out of electrical contact.

2. In an electric welding device comprising a frame, a body member adjustably mounted on said frame, a pair of plungers mounted in said body member for movement therein, adustable loading means for applying pressure on each of said plungers, a pair of electrode arms each having an adjustable electrode thereon secured to a respective one of said plungers, a cam, a pair of bearing rolls each secured to a respective one of said plungers for controlling the movement of said plungers, said bearing rolls riding on opposite portions of said cam, and means for driving said cam.

3. In an electric welding apparatus in combination, a hollow body member, a pair of moveable plungers housed in said body member, one of said plungers having a channel therein, the other of said plungers having a protruding rod housed in said channel for slideable movement therein, each said plungers having a stud, spring means surrounding each of said studs and bearing on said plungers, an adjustable nut bearing on each of said springs for varying the pressure applied to each of said plungers, an adjustable electrode connected to each of said plungers and being moveable therewith, means for controlling the movement of said plungers, said means including a cam, means for rotating said cam, a pair of bearing rolls riding on different portions of said cam, each of said bearing rolls having a control arm, one of said control arms being connected to said one plunger, and the other of said control arms being connected to said other plunger, said plungers moving in accordance with the shape of said cam.

References Cited in the file of this patent
UNITED STATES PATENTS

| | | |
|---|---|---|
| 1,536,838 | Geisenhoner | May 5, 1925 |
| 1,610,616 | Schlaf | Dec. 14, 1926 |
| 1,920,630 | Conn | Aug. 1, 1933 |
| 2,071,473 | Roth | Feb. 23, 1937 |
| 2,727,122 | Gartner | Dec. 13, 1955 |

FOREIGN PATENTS

| | | |
|---|---|---|
| 58,419 | Denmark | Feb. 10, 1941 |